(12) United States Patent
Demsky et al.

(10) Patent No.: US 6,868,393 B1
(45) Date of Patent: Mar. 15, 2005

(54) CLIENT-CENTRIC INTERNET SHOPPING SYSTEM, METHOD AND PROGRAM

(75) Inventors: Scott Harvey Demsky, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/513,818

(22) Filed: Feb. 24, 2000

(51) Int. Cl.$^7$ .............................................. G06F 17/60
(52) U.S. Cl. ...................................................... 705/26
(58) Field of Search ............................. 705/26, 27, 28, 705/29, 80

(56) References Cited

U.S. PATENT DOCUMENTS

| | | | |
|---|---|---|---|
| 5,615,269 A | * 3/1997 | Micali | 705/7 |
| 5,794,207 A | * 8/1998 | Walker et al. | 705/1 |
| 5,890,137 A | 3/1999 | Koreeda | |
| 5,937,391 A | 8/1999 | Ikeda et al. | |
| 5,966,697 A | * 10/1999 | Fergerson et al. | 235/375 |
| 6,249,772 B1 | * 6/2001 | Walker et al. | 705/26 |
| 6,304,850 B1 | * 10/2001 | Keller et al. | 705/26 |
| 6,317,722 B1 | * 11/2001 | Jacobi et al. | 705/14 |
| 6,356,878 B1 | * 3/2002 | Walker et al. | 705/26 |

FOREIGN PATENT DOCUMENTS

| | | | | |
|---|---|---|---|---|
| JP | 10-320494 | 12/1998 | | |
| JP | 11-154176 | 6/1999 | | |
| JP | 11-154176 A | * 6/1999 | ........... | G06F/17/60 |
| WO | WO98/10361 | 3/1998 | | |
| WO | WO99/33016 | 7/1999 | | |

OTHER PUBLICATIONS

Bartels, Carlton W.; Marron, Donald B.; Lipsky, Michael I.; "Clean air, clear market: making emissions trading work, the role of a computer–assisted auction"; Public Utilites Fortnightly, 131, n12, 14(3), Jun. 15, 1993.*

(List continued on next page.)

*Primary Examiner*—Jeffrey A. Smith
*Assistant Examiner*—Marissa Thein
(74) *Attorney, Agent, or Firm*—Marilyn Smith Dawkins

(57) ABSTRACT

A system, method and program of the invention enables a client in a network of computers to participate with a plurality of merchants across several Web servers in electronic transactions for the purchase of products from the merchants. The client is enabled to make one transaction with one merchant dependent upon the results of another transaction with another merchant. More specifically, each item that is available from any merchant and is selected by a customer using the client is represented at the client as a separate object having states associated therewith. A buy, hold, or conditional state will set a lock on the corresponding object at the Web server such that no other transactions with other customers can take place for that specific item while the current customer is actively using it. A conditional state sends a signal to the merchant to assist in contacting another merchant in order to cancel a previous transaction that the other merchant had with the current customer.

6 Claims, 7 Drawing Sheets

OTHER PUBLICATIONS

"Yahoo! Delivers a One–Stop Internet Shopping Service Featuring More Than 2 Million Products," PR Newswire (Nov. 17, 1998).*

"PDG Launches Shapping Mall," Washington Business Journal, vol. 18, No. 24 (Oct. 22, 1999) p. 20.*

"Acses' 'Comparison Shopping Car' Makes Comparison Shopping Online Easier Than Ever Before," Business Wire (Nov. 17, 1998.*

"Comparison Shopping Made Easy," PR Newswire (Oct. 26, 1998).*

"Yahoo Opens Doors on Yahoo Shopping", (Malcom Maclachlan, TechWeb, Nov. 17, 1998, www.techweb.com/wire/store/TWB19981117S0019).

"BuyWiz Unveils Universal Shopping Cart", (http://ecommerce.internet.com/opinions/print/0,1282,3551_187441,00_html).

"PDG Shopping Mall", PDG Software, Inc. (www.pdgsoft.com/Products_Services/PDG_Mallpdg_mall.html.

One Cancels the Other Order (OCO). http://web.archive.org/web/19981205224116/http://risk.ifci.ch/00012238.htm.

* cited by examiner

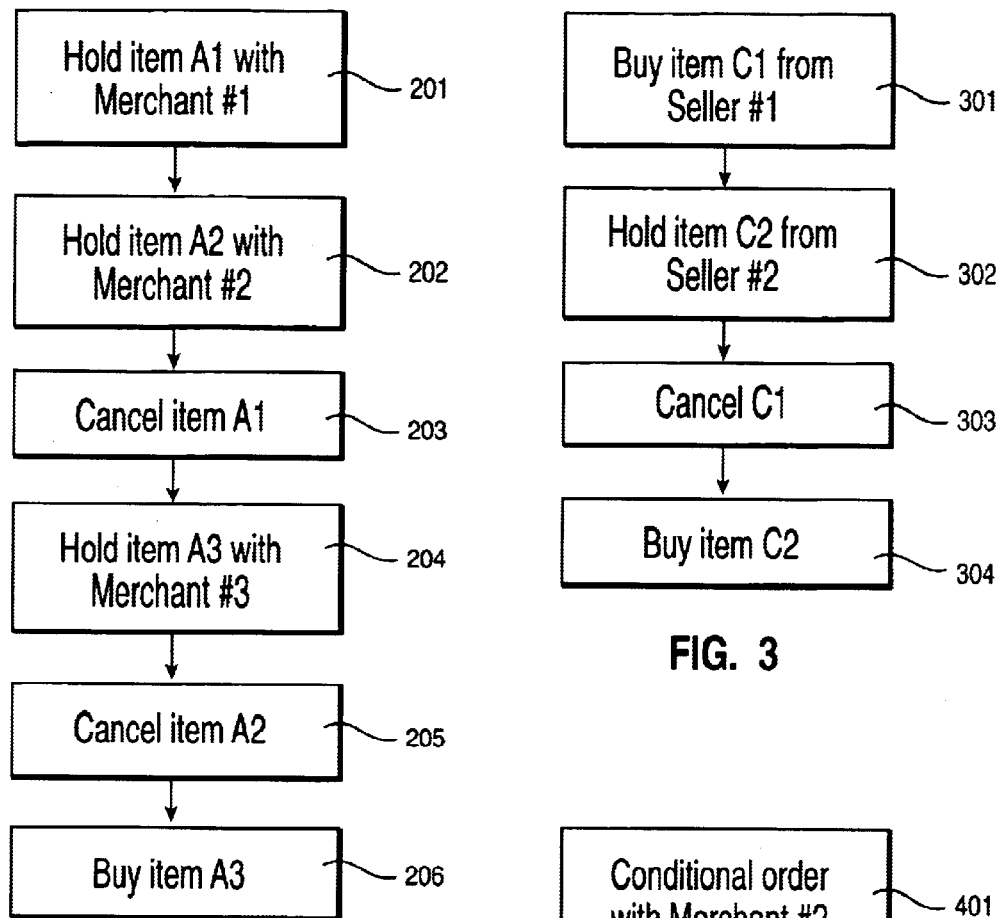
FIG. 2
FIG. 3
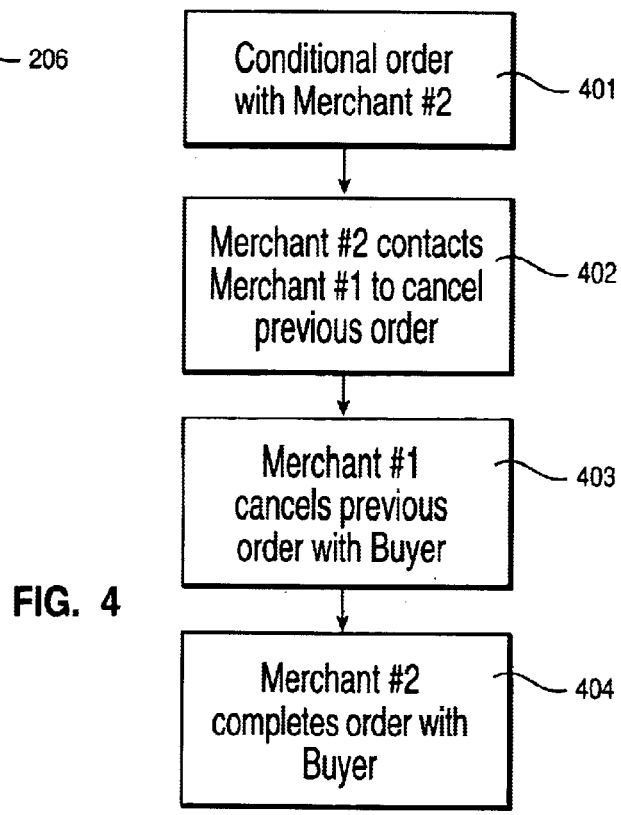
FIG. 4

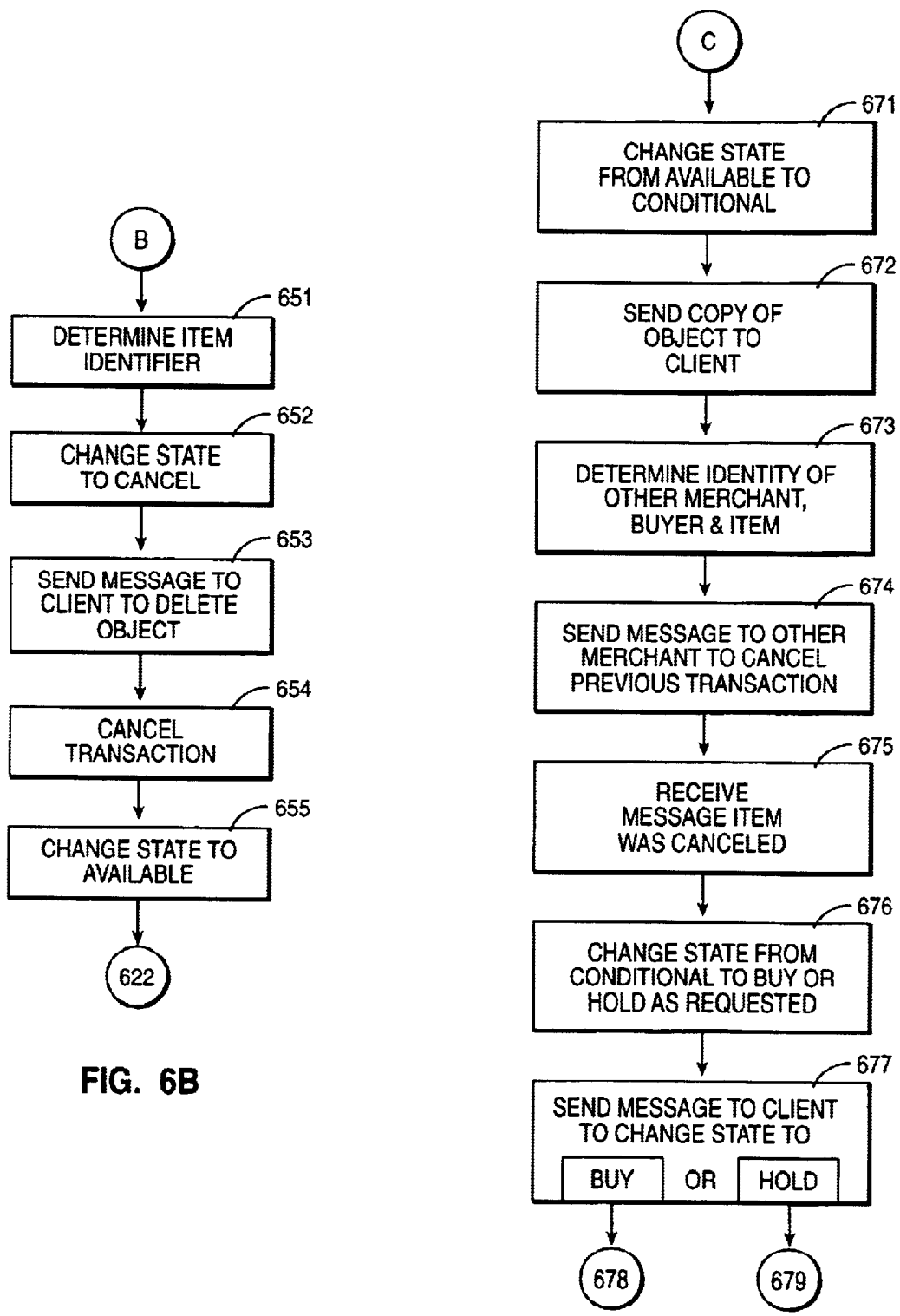

US 6,868,393 B1

CLIENT-CENTRIC INTERNET SHOPPING SYSTEM, METHOD AND PROGRAM

BACKGROUND OF THE INVENTION

1. Field of the Invention

This invention relates to electronic commerce, and more specifically to a system, method, and program for enabling a client to carry out a transaction with one merchant's Web server depending upon a result of a transaction with another merchant's Web server; thereby allowing an on-line shopper to cancel a purchase if a better bargain is found with another merchant, or to go forward with a purchase if a previous purchase transaction with another merchant can be canceled.

2. Description of the Related Art

As computational devices continue to proliferate throughout the world, there also continues to be an increase in the use of networks connecting these devices. Computational devices include large mainframe computers, workstations, personal computers, laptops and other portable devices including wireless telephones, personal digital assistants, automobile-based computers, etc. Such portable computational devices are also referred to as "pervasive" devices. The term "computer" or "computational device", as used herein, may refer to any of such device which contains a processor and some type of memory. The networks connecting computational devices may be "wired" networks, formed using lines such as copper wire or fiber optic cable, wireless networks employing earth and/or satellite-based wireless transmission links, or combinations of wired and wireless network portions. Many such networks may be organized using a client/server architecture, in which "server" computational devices manage resources, such as files, peripheral devices, or processing power, which may be requested by "client" computational devices. "Proxy servers" can act on behalf of other machines, such as either clients or servers.

A widely used network is the Internet. The Internet, initially referred to as a collection of "interconnected networks", is a set of computer networks, possibly dissimilar, joined together by means of gateways that handle data transfer and the conversion of messages from the sending network to the protocols used by the receiving network. When capitalized, the term "Internet" refers to the collection of networks and gateways that use the TCP/IP suite or protocols.

Currently, the most commonly employed method of transferring data over the Internet is to employ the World Wide Web environment, referred to herein as "the Web". Other Internet resources exist for transferring information, such as File Transfer Protocol (FTP) and Gopher, but have not achieved the popularity of the Web. In the Web environment, servers and clients effect data transfer using the Hypertext Transfer Protocol (HTTP), a known protocol for handling the transfer of various data files (e.g., text, still graphic images, audio, motion video, etc.).

The term e-commerce is used herein to refer to any commercial activity using computers interconnected by a communication network, e.g., the Internet. Because of the unique characteristics of the Internet, carrying out commercial transactions over the Internet presents new issues and new opportunities.

Shopping in the real physical world has traditionally involved many factors. Typically, the shopping experience for many people includes negotiations over price; comparisons of price between various merchants; the ability to hold an item at one store for a period of time while other stores are visited to compare the prices and quality of similar products; the ability to return products when dissatisfied for any reason; and the presence of refund policies and procedures.

Canceling committed transactions (e.g. a purchase) is often a necessity in real life scenarios. Currently, many merchants allow for order cancellation if a product has not been shipped. However, this typically involves calling the merchant. Likewise some e-commerce merchants allow for electronic cancellation if a product has not been shipped. Furthermore, if a buyer cancels a transaction and then goes to buy from another merchant, the buyer may find that by the time the transaction is canceled the merchandise is not available from the other merchant.

Current e-commerce systems having a single Web server involved in the transaction are enabled to cancel a transaction as follows. First, the client clicks on the hyper link to show the client's order status from an e-commerce server at time t1. Then, the e-commerce server receives the HTTP request at time t2. The e-commerce server processes the information, and starts sending the page at time t3. The client receives the page and displays it at time t4. The client clicks on some element (e.g. a button) to cancel a transaction at time t5. The e-commerce server receives the HTTP request to cancel the transaction at time t6. The e-commerce server cancels the transaction, and sends notification to the client at time t7. The client receives and displays notification at time t8.

The problem with the above scheme is that the server sends information at time t3 but receives the cancellation request at time t6. Hence, the server must lock the associated data and any processing on it such that the information does not change between time t3 and t6. It should be noted that this is a common problem that is often encountered by database systems. If the locking is not done, the Web client may attempt to cancel transactions based on incorrect information. This would generate negative opinion and lack of trust in the e-commerce system from clients. In addition, time dependent transactions are important in some degree in many if not all areas of commerce, and are even more critical in other areas of commerce, e.g. for arbitrage based trading.

In the real physical world, the shopper is at the center of the shopping experience; either making the decisions or deciding not to shop if the retailer's requirements or policies are anything less than favorable to the shopper. To the contrary, prior art e-commerce systems are "merchant-centric". The merchant-centric nature of e-commerce is made evident by the fact that many of the e-commerce solutions that are being provided today are for e-commerce servers, i.e., the merchant's servers, and not for the buyer's client.

SUMMARY OF THE INVENTION

Therefore, an object of this invention is to provide a "shopper-centric" (otherwise referred to herein as "client-centric") shopping experience for the e-commerce shopper such that the shopping experience revolves around the shopper and not around the merchant.

It is a further object of this invention to enable a client to perform reliable dependent transactions across merchants and Web servers in an Internet based e-commerce system.

A preferred embodiment of the invention enables a client to perform reliable dependent transactions across Web servers. Facilities are provided to a Web client to perform appropriate locking and unlocking of records in Web Servers. This enables a Web client to carry out a transaction with one Web Server depending on the result of a transaction with another Web Server. Such a situation might arise when a Web client wants to cancel a purchase because a better bargain with some other merchant has been found.

More specifically, a client system, used by a customer (otherwise referred to herein as a buyer or consumer), is enabled to communicate over a network with one or more servers used by merchants to carry out transactions between the customer and the merchants. Each item within the inventory of a merchant is represented by an object or other representation. The client system displays a copy of an instance of the object or other representation for each item selected by the customer from any of the merchants. Items can be collected at the client from multiple merchants across multiple servers. When an item is selected from a merchant, the customer also selects a state of the object representing the item. If an item is available from a merchant, the state of the object at the merchant reflects this availability. When the customer selects an available item, the customer can select a state that will change the available state to a new state. The selectable states include states that indicate that the customer desires to carry out a purchase transaction for the item, e.g., "buy" state; or that the customer wants to put the item on hold while the customer considers a purchase decision, e.g., "hold" state; or that indicate that the customer wants to purchase or hold the item only if a previous transaction with the same or different merchant can be canceled, e.g., "conditional" state.

As the item and state are selected by the customer at the client system, the state of the instance of the object of the item at the server is changed from the "available" state to the selected state. This locks the item and associated data from being made available to other customers and client systems.

The state referred to above as the "conditional" state indicates to the merchant owning the subject item that the customer desires to purchase the subject item if a previous transaction is able to be canceled. The customer sends to the owning merchant an identification of the previous merchant and an identification of the item purchased in the previous transaction. The owning merchant contacts the previous merchant to cancel the identified transaction. The owning merchant may even offer an incentive to the previous merchant to entice the previous merchant to cancel the previous transaction. The incentive may cover the transaction costs, and perhaps more, that the previous owner incurred. The owning merchant provides the incentive to gain the sale and the customer's business. If the previous transaction is canceled, a notice is sent to the client which changes the state of the objects to indicate that the previous transaction was canceled and that the condition on the other item has been met such that the item may now reflect a "hold" or "buy" state. In some embodiments, the object of the previous item may even be automatically deleted from the client's collection of items upon receipt of a notification of the cancellation. The e-commerce system, method, and program of this invention has "client-centric" features that enable the shopping experience to include a) competitive shopping across merchants by providing methods for "order cancellation", and by providing methods for "dependent transactions" in which a transaction with one merchant depends upon transactions made earlier with a different merchant; b) product transfers between sellers whereby merchants can contact each other to provide "incentives" for order cancellation; and c) a "client-centric" shopping cart, kept at the client, that has items from many merchants.

The client-centric e-commerce embodiments of the invention enhance the psychological aspects of shopping for the shopper by making the shopper feel in control of the shopping experience, and by enabling the shopper to shop from many merchants rather than having discrete transactions with each separate merchant. One embodiment utilizes a shopping cart which spans different merchants on different Web servers which allows the client to perform price and product comparisons easily and automatically. The "order cancellation" and "dependent transaction" methods readily enable the Internet shopper to shop for bargains across different merchants.

BRIEF DESCRIPTION OF THE DRAWINGS

For a more complete understanding of the present invention and the advantages thereof, reference should be made to the following Detailed Description taken in connection with the accompanying drawings in which:

FIG. 2 is a flow chart for carrying out a buyer's desire to cancel a transaction on hold with a first Web server to enable the buyer to complete a transaction with a second Web server;

FIG. 3 is flow chart for carrying out a buyer's desire to cancel a completed transaction with a first Web server to enable the buyer to complete a transaction with a second Web server;

FIG. 4 illustrates a transaction flow wherein a first merchant, pursuant to a request by the buyer, provides incentive to a second merchant to cancel a previous transaction with the buyer;

FIGS. 6A–6C illustrate the process flow at a merchant's Web server for changing the state of an object depending upon the client's request.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
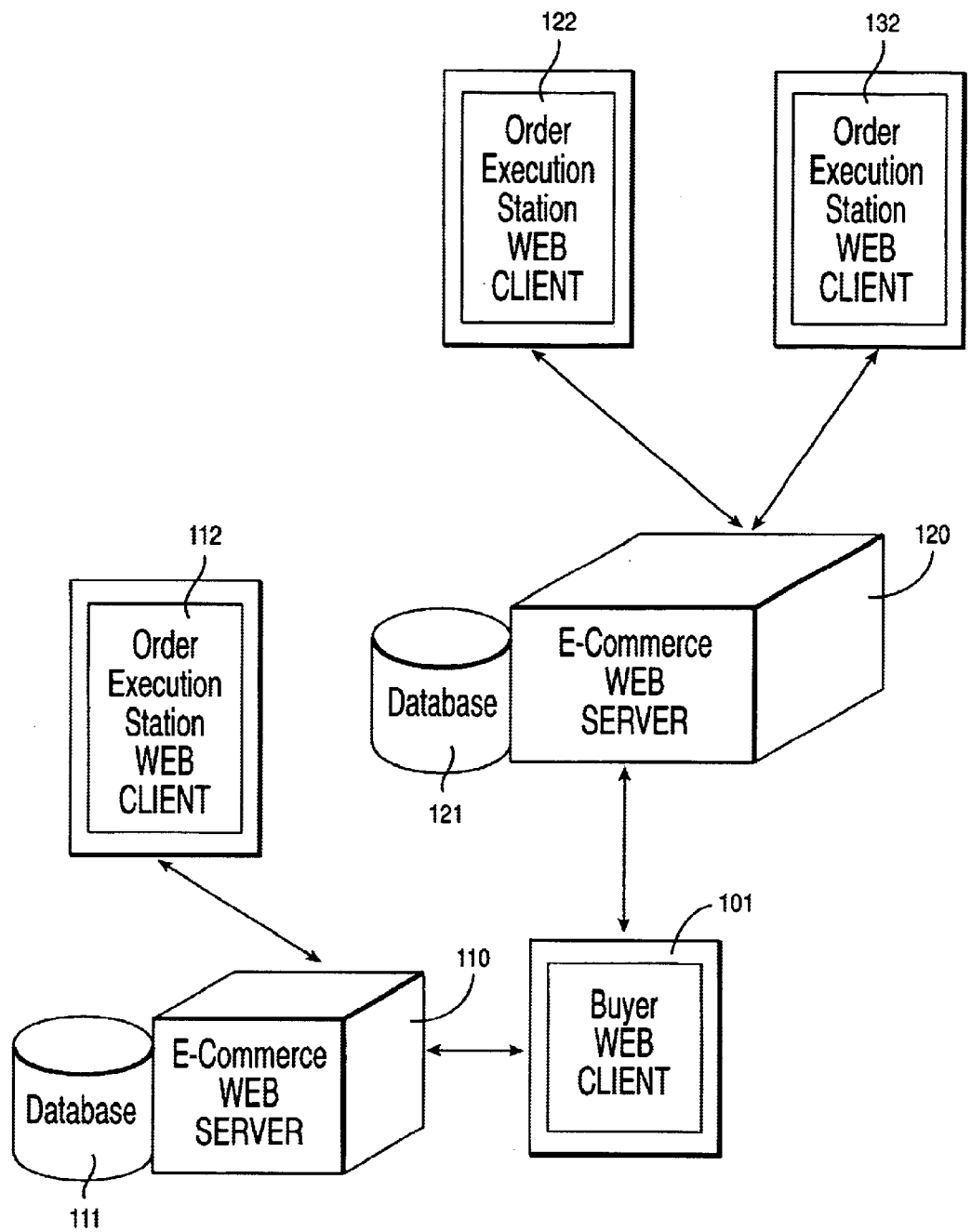
FIG. 1 illustrates an e-commerce infrastructure utilizing the features of the invention.

FIG. 1 shows a block diagram of a "client-centric" e-commerce infrastructure embodying the invention. There is a multiplicity of e-commerce servers 110, 120 with which a single buyer Web client 101 can interact. Each e-commerce Web server is typically connected to a database 111, 121 and several "intranet" or "Internet" based "order execution station" web clients 112, 122, 132. An order execution station enables real time updates to a transaction or to a portion of a transaction. For example, the United Parcel Service may have a central e-commerce server such as 120. Its employees would update the status of a delivery by entering data into the "order execution station" web clients 122, 132 as various phases of the delivery are completed. Similarly, a nationwide retail chain may have order execution stations connected to their central Web server via the Internet.

Order Cancellation and Dependent Transactions

The method, means and program function of the preferred embodiments for carrying out a buyer's desire to cancel a committed transaction, e.g., a purchase, is described below with reference to FIG. 1 and FIG. 2. For example, the buyer Web client 101 may wish to cancel a transaction with one Web Server 110, but may wish to do it only if the buyer can complete a transaction with the other Web Server 120. In the preferred embodiments of the invention, an order cancellation includes techniques for resolving dependent transactions.

One implementation approach is through the use of distributed objects. Based on the efforts presently going on today, distributed objects is likely to be the core feature of the next generation of the HTTP protocol. Resolving dependent transactions can also be implemented by traditional database locking and unlocking mechanisms. However, these are typically under the control of, and carried out by, the database server and not the client.

FIG. 2 illustrates a transaction flow, including order cancellations, between a buyer and multiple merchants. First, a buyer holds an item "A1" with merchant #1 and continues shopping, 201. If the buyer finds a better bargain for a similar item "A2" with merchant #2, the buyer holds item "A2" with merchant #2, 202. The buyer cancels item "A1" with merchant #1 and continues shopping, 203. If the buyer finds a better bargain for a similar item "A3" with merchant #3, the buyer holds item "A3" with merchant #3, 204. The buyer cancels item "A2" with merchant #2, 205; and buys item "A3" from merchant #3, 206.

FIG. 3 illustrates another transaction flow embodiment. A buyer orders an item "C1", e.g., a chair, for $50 from seller 1, 301. In this example, the buyer does not request a hold, but instead "buys" item "C1". State 1 is "bought". The buyer then orders a similar item "C2", e.g., a different chair, from seller 2 for $45 and requests a hold, 302. State 2 is "hold". Now, the buyer requests a cancellation of item "C1" from seller 1, 303. The cancellation is granted. State 1 becomes "canceled". The buyer can explicitly buy item "C2" in which case State 2 changes from "hold" to "bought", 304. If there is no explicit action from the buyer after a predetermined amount of time "T", e.g., 5 hours, the "hold" state associated with item "C2" automatically changes to either "bought" or "canceled" depending upon the specific implementation.

Product Transfer Incentives

Instead of a buyer canceling the order with merchant 1 and then contacting merchant 2 to place an order, a preferred embodiment of the invention enables the transaction flow as described with reference to FIG. 4. First, a buyer places an order with merchant 2 conditional on the fact that the electronic transaction made earlier with merchant 1 is canceled by merchant 2, step 401. Merchant 2's Web server contacts Merchant 1's Web server and offers an "incentive" of a given amount to cancel the earlier transaction of the buyer, step 402. If Merchant 1's Web server accepts the offer, step 403, then Merchant 2 fulfills the order of the buyer, step 404.

This product transfer transaction flow between merchants is beneficial to each party involved. The buyer gets the desired product from a selected merchant offering the best conditions, e.g., price and/or availability and/or warranty, etc. Merchant 1 gains some money to possibly cover its transaction costs. Merchant 1 also establishes good customer relations by allowing automatic order cancellation with minimal effort on the buyer's part. Merchant 2 obviously benefits through an additional sale.

Client-Centric Shopping Cart

A preferred embodiment of the invention utilizes the transaction flows described above including order cancellation using dependent transactions, and product transfer incentives, along with a client-centric shopping cart. The client-centric shopping cart is implemented through software at the client. The shopping cart keeps equivalent or similar items from different merchants grouped together, so that the client can easily perform competitive shopping. By clicking on a particular item in the "client-centric" shopping cart, the client is taken to the Web server page from which the item was extracted.

An example of client-centric shopping cart is given below:

| Seller: Amazon.com | | | |
|---|---|---|---|
| Shopping cart at seller: | | | |
| Item ID 3487 | "Gone With the Wind" | | $11.50 |
| Item ID 3434 | "C++ Programming" | | $10.00 |
| Seller: Bookseller.com | | | |
| Shopping cart at seller: | | | |
| Item ID AAAB | "Gone With the Wind" | | $13.00 |
| Item ID AA45 | "Java programming" | | $30.00 |
| Client-centric shopping cart | | | |
| "Gone With the Wind" | Amazon.com | Item ID 3487 | $11.50 |
| "Gone With the Wind" | Bookseller.com | Item ID AAAB | 13.00 |
| "C++ Programming" | Amazon.com | Item ID 3434 | 10.00 |
| "Java programming" | Bookseller.com | Item ID AA45 | 30.00 |

Implementation

A preferred embodiment is described which utilizes distributed objects to carry out the above transaction flows. The Web servers and Web clients are endowed with the appropriate functionality to carry out these transaction flows. Variations to the preferred embodiment could be made without departing from the spirit and scope of the invention. Likewise, other implementations and embodiments could also be used. For example, relational and hierarchical databases could also be used to store, manipulate, access and lock inventory items and the associated data from merchants as records within the databases.

Figure 5:
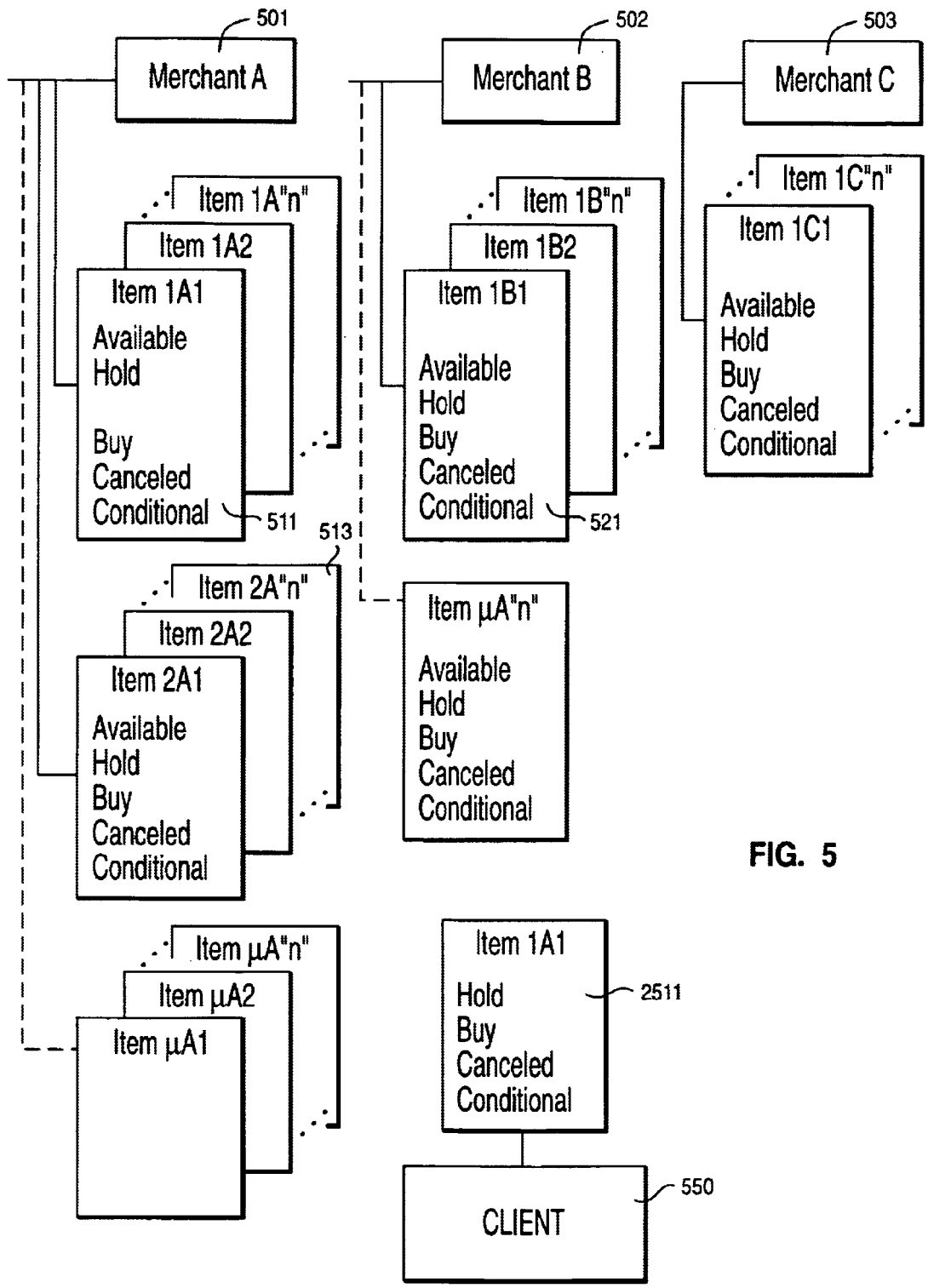
FIG. 5 illustrates inventory items represented as objects in a network of e-commerce merchants and clients.

FIG. 5 shows multiple merchants, merchant A, merchant B, merchant C on separate Web servers, 501, 502, 503. It should be noted that the merchants do not necessarily have to be on separate Web servers. More than one merchant can be on the same Web server. Each merchant has a separate and distinct URL regardless of whether or not it shares a Web server with another merchant.

There is a separate object for each item belonging to a merchant. For example item # 1A1, 511, indicates that this is a first item, such as a chair, from merchant A, and it is the first chair item within the merchant's inventory of "n" chairs. A third chair item within the inventory may be designated as "item 1A3". Likewise, a desk from merchant A is shown herein as item "2An" 513 where "n" indicates which specific desk within the inventory of desks it is. In essence, each unique item from a merchant is represented as a unique object.

Depending upon the specific implementation, each object has some, if not all, of the following attributes or states: available, hold, buy, canceled, and conditional. If an item is indicated to be "available", an instance of the object can be copied to, i.e., sent to, the client and placed in the client's shopping cart. Once an instance of the object is sent to the client, the state of the object changes to either "hold" or "buy" or "conditional". When the state changes, the particular object is no longer available and cannot be sent to another client. When the client or another merchant sends a message to a Web server to cancel a transaction, the instance of the object at the client is deleted, and the state of the instance of the object at the Web server changes to "canceled". After the Web server processes the cancellation, the Web server will change the state of its object from canceled to "available", thereby making that object available to another client.

The state of an object can change to "conditional" pursuant to the following scenario. The client can send a message to a merchant, e.g., merchant A, indicating that the client desires to buy item 1A1, 511, from that merchant if merchant B will cancel item 1B1, 521. The state of item 1A1 at merchant A changes from "available" to "conditional" as a copy of the object 2511 with the conditional state is sent to the client 550. In the message from the client to merchant A, the client has included the necessary information identifying the merchant, the item from the merchant, and the buyer. Merchant A sands a message to the identified merchant, e.g., merchant B, identifying the item and the buyer and requesting a cancellation of that transaction. Merchant B changes the state of the object at merchant B from bought to canceled and sends a message to the buyer that deletes the copy of the object from the buyer's shopping cart. When merchant B completes the processing of the cancellation, merchant B will change the state of its object 521 for that item from canceled to available. Merchant B will then send a message to merchant A indicating that the transaction has been canceled. Merchant A changes the state of the object of its item 511 from conditional to either bought or hold, depending upon the desires of the buyer as indicated in the first message between the buyer and merchant A.

A client is enabled to select and collect objects with specified states representing the items from various merchants across one or more Web servers. As each item (i.e., object) is collected, it is displayed, along with any other collected items, at the client along with an indication of the specified states of each item. The client is also enabled to change the state of any of the objects of the items displayed. Upon a change of state, the client will automatically send an indication to the applicable merchant that the state is changed. This can be done through a URL link associated with each selectable state on each object. Other means can also be used such as by the sending of messages. Depending upon the initial state of the object selected, and any changed states thereafter, the Web server of the corresponding merchant will perform any necessary locking of objects or associated data and/or will perform any necessary processing.

Figure 6A:
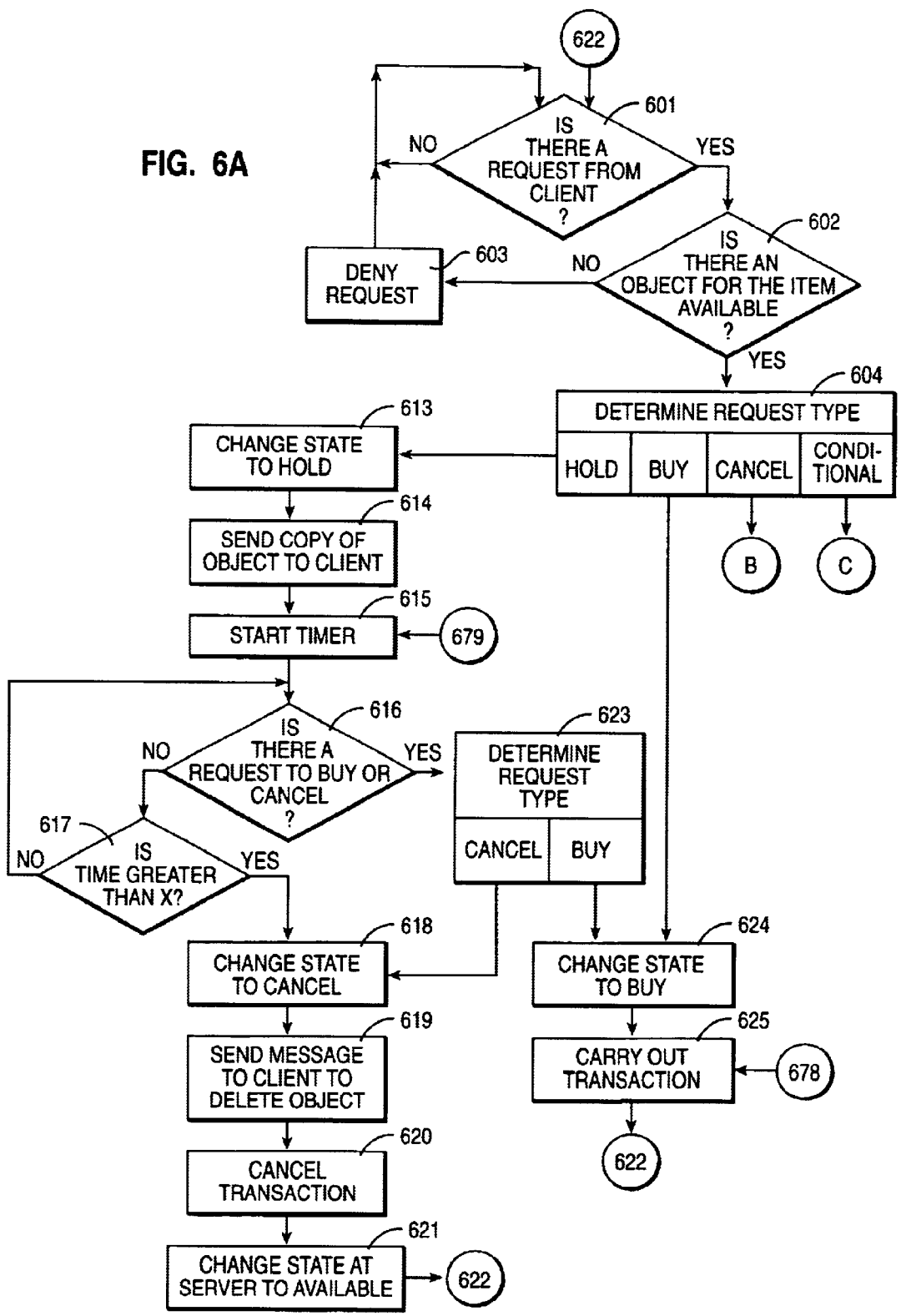

FIGS. 6A–6C illustrate the process steps, system means, and program function at a Web server for managing the states of the objects for various transactions in response to selections made by a client. At 601, FIG. 6A, the Web server waits for a request from a client for a specific item. If there is a request for an item, the Web server determines if there is an object available for the item 602. If not, the request is denied and a request_denied message is sent back to the client, 603. Then, the Web server continues to wait for a next request 601. If an item is available, the Web server determines the request type as being either hold, buy, cancel, or conditional 604.

For a hold request, the following events occur. If an object is available, the state is changed to hold, 613; and a copy of the object is sent to the client, 614. A timer is started, 615, to determine if a buy or cancel request, 616, is received for the object within a predetermined time period 617. If the time period expires, the hold state is changed to the cancel state, 618, and a message is sent to the client to delete the object, 619. The Web server then cancels the transaction, 620. When the Web server completes the cancellation process, the state of the object is changed from cancel to available, 621. If there is a request to buy or cancel, 616, then the Web server determines the type of the request 623. If a cancel request was received, the process continues with steps 618–621, as described above. If a buy request is received, the state of the object is changed to buy 624, and the server carries out the buying transaction 625.

Returning to step 604, if instead of a hold request, the request was initially a buy request, the state of the object at the server is changed to buy 624. The Web server completes the buying transaction with the client 625.

At step 604, FIG. 6A, if the request was a cancel request, the Web server continues processing as shown in FIG. 6B. The Web server determines the item, 651, and changes the state to cancel, 652. The Web server sends a message to the client to delete the object, 653, and cancels the transaction 654. The Web server then changes the state of the object to available, 655.

At step 604, FIG. 6A, if the request was a conditional request, the Web server continues processing as shown in FIG. 6C. The Web server changes the state of the object from available to conditional 671, and sends a copy of the object to the client 672. The Web server determines the identity of the other merchant, buyer, and item from the request, 673. The Web server sends a message to the other merchant to cancel the item with the buyer, 674. When the Web server receives confirmation that the other merchant has canceled the previous transaction with the buyer, 675, then the state is changed from conditional to buy or hold as requested, 676 at both the server and the client 677. Processing continues at either steps 678 or 679 as shown in FIG. 6A.

Figure 7A:
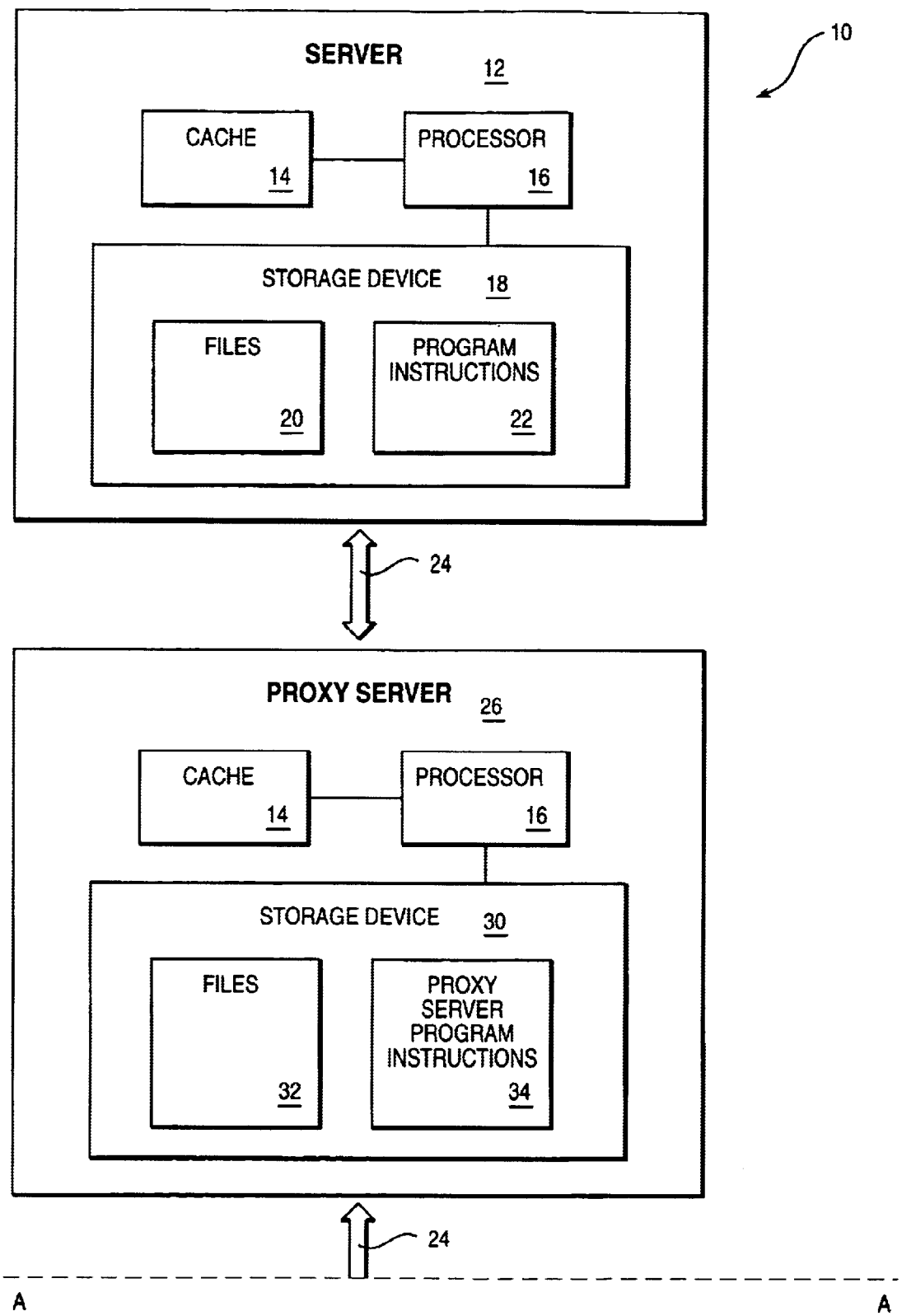
FIG. 7 is a block diagram of computational devices in a client/server network such as the Internet.
Figure 7B:
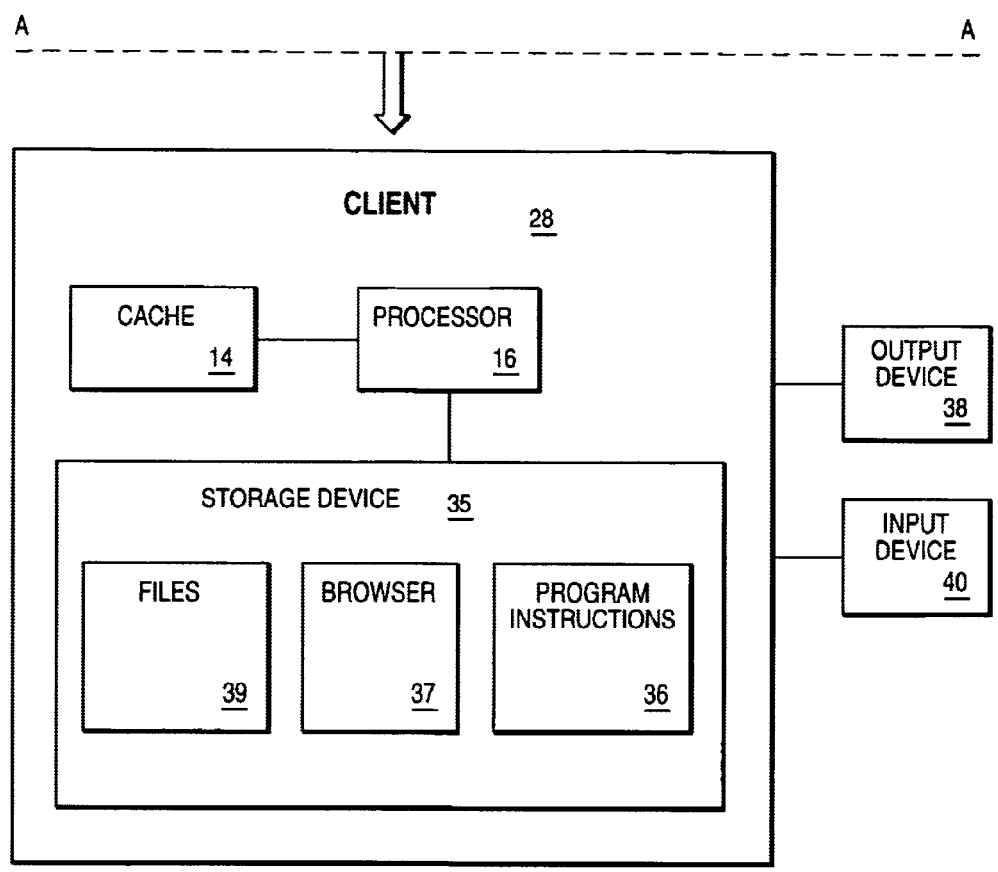

FIG. 7 illustrates an embodiment of a system 10 for transferring information within a client/server network. System 10 includes computational devices used as a network server, a proxy and a client. A computational device may be, but is not limited to, a personal computer, laptop, workstation, mainframe or hand held computer including palmtops, personal digital assistants, smart phones, and/or cellular phones. In the embodiment of FIG. 7, server 12 includes cache 14, processor 16 and storage device 18. Cache 14 is a collection of storage locations which are rapidly accessible by processor 16. In an embodiment, cache 14 may be a portion of the processor's system memory allocated for temporary storage. Storage device, or storage medium, 18 may take many forms, such as volatile and/or nonvolatile memory or any combination thereof. Volatile memory may be any suitable volatile memory device, e.g., RAM, DRAM, SRAM. Nonvolatile memory may include storage space, e.g., via the use of hard disk drives or tapes. Some example storage mediums include a magnetic disk, a hard drive or floppy drive, an optical disk, and/or magnetic tape. Such a storage device is sometimes referred to as a "direct access storage device" (DASD). Typically, storage device 18 has a larger storage capacity than cache 14, but takes longer for processor 16 to access.

In the embodiment of FIG. 7, storage device 18 includes files 20 and program instructions 22, also referred to as program executables. The program instructions are typically stored as "executable files" in a storage device and loaded into memory during execution. Files 20 may include documents such as Web pages suitable for viewing by a user of the network, and may contain text, graphics, video and/or audio information. Such document files may be in the HTML language, or in other suitable languages such as Extensible Markup Language (XML) or Wireless Markup Language (WML). Files 20 may further include data files suitable for use by computational devices in communicating across the network. "Files" as used herein may refer to any collection of data suitable for storing on a computational device or transferring within a network. Program instructions 22 may include various program instructions used to implement functions of network server 12, such as program instruction used to implement the methods described herein.

Transmission medium 24 may be used to connect network server 12 to other computational devices, such as proxy server 26 and/or client 28. Transmission medium 24 may include, for example, a wire, cable, wireless transmission path, or a combination of these. Protocols used for transmission medium 24 may include TCP/IP, HTTP, and/or other suitable protocols such as Wireless Applications Protocol (WAP).

System 10 may include client 28, linked to server 12 using transmission medium 24. In the embodiment of FIG. 7, client 28 includes cache 14, processor 16, and storage device 35. Storage device 35 is similar to storage device 18 described above, and may include files 39, a browser program 37 and program instructions 36. Program instructions can include operating system program instructions and application program instructions. Although a browser program such as browser 37 is implemented using program instructions (or executables) such as instructions 36, browser 37 is shown separately in FIG. 7 to emphasize this feature of the client. Browser program 37 may be, for example, a web browser which allows a user to retrieve and view files on the World Wide Web (WWW), or a program which performs a similar function on some other network. In some embodiments, client functions involved in implementation of the methods described herein are included in browser 37. Such functions, and/or other functions of the client computing device, may also be implemented in separate program instructions such as program instructions 36. Files 39 may include various files stored on the client computational device, including files downloaded from a network server such as server 12. Client 28 is typically associated with an output device 38 and input device 40, particularly in embodiments for which the client computational device is operated by a user of the system 10. Output device 38 may include, for example, a display screen and/or a printer. Input device 40 may include, for example, a keyboard, voice input system, touch sensitive device, and/or a pointing device such as a mouse, track ball, light pen, pen-stylus, and/or any other input means.

In some embodiments, system 10 may also include a proxy server 26. A proxy server as used herein refers to a computational device which acts as an intermediary between a client and a "real" server. The proxy server may appear as a server to the client, and as a client to the real server. Requests from the client may be responded to by the proxy server, or passed on to the real server. Files or other communications from the real server may be passed on to the client by the proxy server. A proxy server may be employed in system 10 for various reasons. For example, proxy servers may be used to provide specialized content and/or improved performance to a selected group of client computers. An example of this may be the use of caching by proxy servers to increase the speed of providing some files to subscribers to a particular Internet Service Provider (ISP). Another use of a proxy server may be to filter the information being sent from the client to a real server, and/or from the real server to the client. In the embodiment of FIG. 7, proxy server 26 includes cache 14, processor 16, and storage device 30. Storage device 30 may include files 32 and proxy server program instructions 34. Files 32 may include any files stored on the proxy server, such as files being transmitted between a server and a client. Program instructions 34 may include various program instructions used to implement functions of proxy server 26, such as interacting with client computers.

In FIG. 7 and in any other block diagrams appearing herein, the blocks are intended to represent functionality rather than specific structure. Implementation of the represented system using circuitry and/or software could involve a combination of multiple blocks into a single circuit or device, or a combination of multiple circuits and/or devices to realize the function of a block. For example, cache 14 may be included on a semiconductor chip embodying processor 16. Furthermore, a system such as system 10 may include other elements not explicitly shown. For example, multiple servers, proxy servers, and/or clients not shown in FIG. 7 may be included in a system used for implementing the methods and functions described herein. Further, the server, proxy server, and/or client computational devices may themselves include additional elements not shown.

The exemplary embodiment shown in FIG. 7 is provided solely for the purposes of explaining the preferred embodiments of the invention; and those skilled in the art will recognize that numerous variations are possible, both in form and function. For instance, any one or more of the following—the processor and/or memory and/or the input/output devices—could be resident on separate systems such as in a network environment.

The preferred embodiments may be implemented as a method, system, or article of manufacture using standard programming and/or engineering techniques to produce software, firmware, hardware, or any combination thereof. The term "article of manufacture" (or alternatively, "computer program product") as used herein is intended to encompass data, instructions, program code, and/or one or more computer programs, and/or data files accessible from one or more computer usable devices, carriers, or media. Examples of computer usable mediums include, but are not limited to: nonvolatile, hard-coded type mediums such as CD-ROMs, DVDs, read only memories (ROMS) or erasable, electrically programmable read only memories (EEPROMs), recordable type mediums such as floppy disks, hard disk drives and CD-RW and DVD-RW disks, and transmission type mediums such as digital and analog communication links, or any signal bearing media.

The foregoing description of the preferred embodiments of the invention has been presented for the purposes of illustration and description. It is not intended to be exhaustive or to limit the invention to the precise form disclosed. Many modification and variations are possible in light of the above teaching. For example, although preferred embodiments of the invention have been described in terms of the Internet, other network environments including but not limited to wide area networks, intranets, and dial up connectivity systems using any network protocol that provides basic data transfer mechanisms may be used.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

What is claimed is:

1. A method for carrying out, over a communication network of interconnecting computers, electronic transactions between a plurality of merchants using at least one server computer and at least one buyer using a client computer, comprising:

displaying, at the client computer, a separate representation for each item selected by the buyer from at least one merchant two different merchants, wherein each separate representation has an associated one of a plurality of selectable states, and wherein a certain one of the plurality of selectable states indicates that the buyer desires to purchase an item from a first merchant if a previous committed transaction which bought another previous item from a second merchant can be canceled;

displaying an indication of the one associated selectable state with each displayed separate representation; and selecting one of the displayed separate representations to have a selectable associated state that indicates that the buyer desires to purchase a desired item from the first merchant if a given previously committed transaction which bought another previous item from the second merchant can be canceled:

in response to selecting, i) making an identification of the second merchant and the previous item, ii) sending an electronic communication to the second merchant from the first merchant to cancel the previous committed transaction; and iii) if a confirmation is received indicating that the previous committed transaction was canceled by the second merchant, automatically changing the state of the first item to a state different from the conditional state, wherein further transaction processing to purchase the first item is dependent upon the changed state as a result of a successful cancellation transaction of the previous item carried out by the first merchant on behalf of the buyer as initiated by the buyer by selecting the conditional state in association with the first item.

2. The method of claim 1 wherein the selected associated state causes an indication to be sent from the client computer to the first merchant to lock specific data associated with the desired item from being accessible by a different client computer during a period that an associated representation for the desired item has the selected associated state.

3. The method of claim 1 wherein the different state provides an indication of one of the following: a) the buyer desires to put the desired item on hold for a time to consider buying the desired item, and b) the buyer has bought the desired item.

4. A method for carrying out, over a communication network of interconnecting computers having at least one client computer system and at least one server computer system, electronic transactions wherein a buyer using the client computer system purchases items from a plurality of merchants using the at least one server computer system, comprising:

displaying, at the client computer, a separate representation for each item selected by the buyer from at least one merchant;

associating, one of a plurality of selectable states selected by the buyer with each separate representation;

in response to associating a conditional state selected by the buyer with a displayed first item, wherein the selected conditional state is indicative of the buyer desiring to purchase the first item from a first merchant if a previous committed transaction which bought a previous item from a second merchant can be canceled:

i) receiving an identification of the previous item and the second merchant;

ii) sending an electronic communication to the second merchant from the first merchant to cancel the previous committed transaction; and iii) if a confirmation is received indicating that the previous committed transaction was canceled by the second merchant, automatically changing the state of the first item to a state different from the conditional state, wherein further transaction processing to purchase the first item is dependent upon the changed state as a result of a successful cancellation transaction of the previous item carried out by the first merchant on behalf of the buyer as initiated by the buyer by selecting the conditional state in association with the first item.

5. A merchant computer system, utilized by a first merchant, enabled to communicate over a network with at least one client computer system for carrying out electronic transactions with a buyer using the client computer system for the purchase of items, comprising:

means for sending to the client computer, a separate representation for each item selected by the buyer;

means for associating, one of a plurality of selectable states selected by the buyer with each separate representation;

means responsive to said associating a conditional state selected by the buyer with a displayed first item, wherein the selected conditional state is indicative of the buyer desiring to purchase the first item from the first merchant if a previous committed transaction which bought a previous item from a second merchant can be canceled:

i) means for receiving an identification of the previous item and the second merchant;

ii) means for sending an electronic communication to the second merchant from the first merchant to cancel the previous committed transaction; and iii) if a confirmation is received indicating that the previous committed transaction was canceled by the second merchant, means for automatically changing the state of the first item to a state different from the conditional state, wherein further transaction processing enabling a purchase of the first item is dependent upon the state changing as a result of a successful cancellation transaction of the previous item carried out by the first merchant on behalf of the buyer as initiated by the buyer by selecting the conditional state in association with the first item.

6. A computer program having computer readable program code means, on a computer usable medium, for enabling a merchant computer system, utilized by a first merchant, to communicate over a network with at least one client computer system for carrying out electronic transactions with a buyer using the client computer system for the purchase of items, comprising:

means for sending to the client computer, a separate representation for each item selected by the buyer;

means for associating, one of a plurality of selectable states selected by the buyer with each separate representation;

means responsive to said associating a conditional state selected by the buyer with a displayed first item, wherein the selected conditional state is indicative of the buyer desiring to purchase the first item from the first merchant if a previous committed transaction which bought a previous item from a second merchant can be canceled:

i) means for receiving an identification of the previous item and the second merchant;

ii) means for sending an electronic communication to the second merchant from the first merchant to cancel the previous committed transaction; and iii) if a confirmation is received indicating that the previous committed transaction was canceled by the second merchant, means for automatically changing the state of the first item to a state different from the conditional state, wherein further transaction processing enabling a purchase of the first item is dependent upon the state changing as a result of a successful cancellation transaction of the previous item carried out by the first merchant on behalf of the buyer as initiated by the buyer when a selection of the conditional state in association with the first item is made.

* * * * *